United States Patent [19]
Rohwer et al.

[11] 3,956,075
[45] May 11, 1976

[54] FABRICATION OF FOIL DISC PRESSING MATRICES

[75] Inventors: Werner Rohwer, Ellerdorf; Alwin Wühle; Klaus Röschmann, both of Nortorf, all of Germany

[73] Assignee: TED Bildplatten Aktiengesellschaft, AEG-Telefunken, Teldec, Zug, Switzerland

[22] Filed: Feb. 21, 1974

[21] Appl. No.: 444,345

[30] Foreign Application Priority Data
Feb. 23, 1973 Germany............................ 2308891

[52] U.S. Cl..................................... 204/5; 204/281
[51] Int. Cl.² ...................... B29D 17/00; C25D 1/00
[58] Field of Search ............... 204/5, 281; 264/107; 274/3, 46 R, 46 C

[56] References Cited
UNITED STATES PATENTS

| | | | |
|---|---|---|---|
| 2,067,502 | 1/1937 | Pollard et al. | 204/5 |
| 2,092,880 | 9/1937 | Hunter et al. | 204/5 |
| 3,584,094 | 6/1971 | Rock et al. | 264/107 |
| 3,787,275 | 1/1974 | Genma | 264/107 |
| 3,801,476 | 4/1974 | Roschmann et al. | 204/281 |

FOREIGN PATENTS OR APPLICATIONS
637,310 10/1936 Germany ........................... 264/107

*Primary Examiner*—T. M. Tufariello
*Attorney, Agent, or Firm*—Spencer & Kaye

[57] ABSTRACT

A matrix, which is to be employed for pressing foil disc copies carrying a spiral groove which is highly concentric to the axis of disc rotation, is formed by electrodeposition from a lacquer foil original which is cut to form a groove corresponding to such spiral groove and to form additional grooves deeper than the spiral groove and having a form that produces, on the matrix, sharp edges capable of directly cutting the outer periphery and center hole of a foil disc copy.

5 Claims, 2 Drawing Figures

FABRICATION OF FOIL DISC PRESSING MATRICES

BACKGROUND OF THE INVENTION

The present invention relates to a method for galvanically producing pressing matrices which are to be used for producing foils, particularly grinding foils which are capable of rotating with very little eccentricity between the groove turns and the axis of rotation on a playback instrument for picture records and which serve to grind a worn pickup to restore its desired shape.

Pickups for picture records have a shorter lifetime than pickups for phonograph records as a result of the relatively high information density associated with the former. It has therefore been found advisable to restore the pickup to its original, desired shape, after a certain period of use, by a grinding process. This can be effected either automatically by a grinding device built directly into the playback device, or the grinding may be performed at a central location. In either case it is necessary to have available grinding belts or foils of suitable quality.

It has been discovered that the grinding foils produced according to prior art methods do not rotate sufficiently concentrically, i.e. wih sufficiently small eccentricity between the groove turns and the axis of rotation, to produce high quality grinding at the required high rate of revolution, which is of the order of 10,000 rpm.

It is known to produce centered matrices for phonograph and video records from a lacquer foil in that a centering core having a galvanically reproduceable centering edge is inserted into the lacquer foil whereupon the groove is cut and then a matrix is produced therefrom by galvanic means.

The matrix with the reproduced profile of the centering core is then built into the pressing mold.

This process, however, requires cutting the center hole out of the foil upon completion of the stamping process, thus producing a further possibility for error and the creation of eccentricities. The high rates of revolution of about 10,000 rpm required for the grinding of pickups, require greater precision. This precision cannot be attained with the prior art methods.

SUMMARY OF THE INVENTION

It is an object of the present invention to eliminate the above-mentioned possibilities for errors.

Another object is to provide an improved operating method for producing foils with less eccentricity.

The present invention relates to a method for producing matrices for the cutting of grooves into foils, particularly for foils which will act to grind pickups for picture records, by galvanical duplication of a lacquer foil wherein, before or after cutting the information grooves or grinding grooves into the lacquer foil original, additional grooves which are deeper than the information or grinding grooves, respectively, are cut into the foil so as to form cutting edges on the matrix.

The stamping of cutting grooves, the centering, and the cutting of the outer diameter of record copies can thus be effected by the matrix in one operating step.

DESCRIPTION OF THE PREFERRED EMBODIMENTS

Figure 1A:
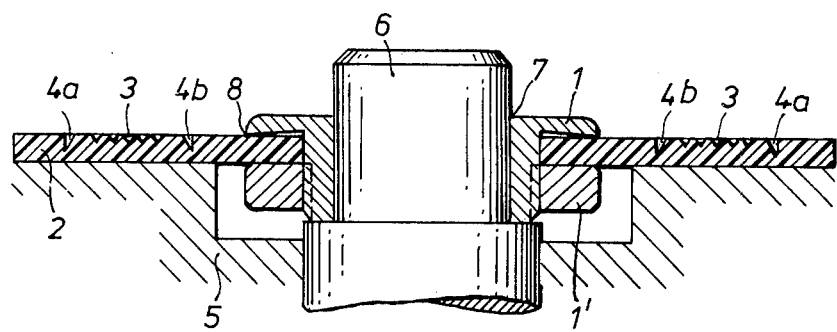
FIG. 1a is a cross-sectional view of an arrangement for producing a matrix according to the invention.

FIG. 1a shows an arrangement in which a threaded centering core constituted by threadedly engaging components 1 and 1' is inserted into a central hole in the lacquer foil blank 2 before the grinding groove profile is cut. The lacquer foil original 2 with the screwed-in centering core 1, 1' is held by the takeup pin 6 of a standard cutting disc 5, pin 6 passing through a mating bore 7 in core component 1. Before or after cutting of the grinding grooves 3 by a suitable cutting stylus, an additional groove 4b having the form of a cutting edge for producing a centering cut and a groove 4a for providing a cutting edge for cutting the outer circumference of record copies are cut into the foil 2 before it is removed from the cutting disc 5.

Figure 1B:
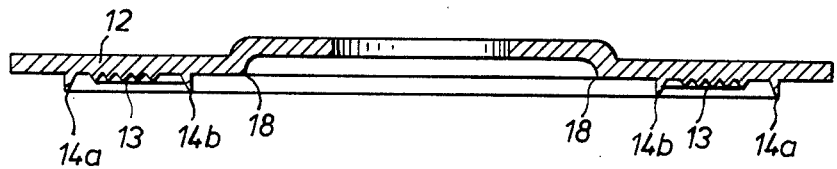
FIG. 1b is a similar view of the resulting matrix.

FIG. 1b shows a matrix 12 galvanically reproduced from original 2 to have the grinding groove profile 13, the centering edge 14b, the cutting edge 14a, and the centering rim 18. The centering rim 18 is concentric with the grinding groove profile 13, the centering edge 14b and the cutting edge 14a and serves to center and fasten the matrix in the pressing mold.

This matrix can then be used to press foil disc copies bearing grinding grooves corresponding to grooves 3 and 13, the outer periphery of the copy being cut by edge 14a and the center hole of the copy being cut by edge 14b.

As is known, matrix 12 can constitute either a master or a stamper. In either case it presents a negative reproduction of the grooves in lacquer foil original 2.

The specific procedures for cutting the original 2 and then forming matrix 12 are already well known in the art and the essentials thereof are disclosed, for example, in U.S. Pat. No. 3,749,828 issued on July 31st, 1973 to Herbert Knothe, Klaus Roschmann and Werner Rohwer.

It will be understood that the above description of the present invention is susceptible to various modifications, changes and adaptations, and the same are intended to be comprehended within the meaning and range of equivalents of the appended claims.

We claim:

1. In the fabrication of a matrix by galvanic reproduction from a lacquer foil original in which a centering core is inserted, which matrix is to be employed for pressing foil disc copies, a method comprising: cutting the surface of a lacquer foil member to form first grooves corresponding to the grooves to be traced on the resulting copy by a playback stylus and additional grooves which are deeper than the first grooves and which have a form such as to produce cutting edges on a matrix formed from the resulting original in which the centering core remains inserted.

2. A process as defined in claim 1 comprising the subsequent step of electrodepositing a layer of material on such lacquer foil surface and the inserted centering core to cause the material to completely fill the first grooves and additional grooves and to conform to the centering core surface, and separating the resulting layer of material from the lacquer foil surface, whereby the resulting layer of material constitutes such a matrix having sharp annular cutting edges formed by the additional grooves and a centering rim concentric with the cutting edges and formed by the periphery of the centering core.

3. A process as defined in claim 2 wherein the first grooves constitute adjacent turns of a continuous spiral groove and the annular cutting edges are circular edges, concentric with the first grooves, one of the cutting edges enclosing the spiral groove and another of the cutting edges being located within the region enclosed by the spiral groove and being dimensioned to produce a centering cut which forms the center hole of a foil disc copy formed with the aid of the matrix.

4. A process as defined in claim 3 wherein the first grooves have the form of playback stylus grinding grooves.

5. A process as defined in claim 3 wherein the first grooves have the form of spatial representations of information capable of being played back by a foil disc playback instrument.

* * * * *